United States Patent [19]

Raith et al.

[11] Patent Number: 5,081,671
[45] Date of Patent: Jan. 14, 1992

[54] METHOD OF REDUCING BLOCKAGES IN HANDING OVER CALLS IN A MOBILE, CELLULAR TELEPHONE SYSTEM

[75] Inventors: Alex K. Raith, Kista; Jan-Erik Uddenfeldt, Vällingby; Bengt Y. Persson, Djursholm; Olov H. Eriksson, Upplands Väsby, all of Sweden

[73] Assignee: Telefonaktiebolaget L M Ericsson, Sweden

[21] Appl. No.: 668,695

[22] Filed: Mar. 7, 1991

Related U.S. Application Data

[63] Continuation of Ser. No. 341,584, Apr. 21, 1989, abandoned.

[30] Foreign Application Priority Data

Apr. 26, 1988 [SE] Sweden .................. 8801555

[51] Int. Cl.⁵ .................. H04M 11/00; H04Q 7/04
[52] U.S. Cl. .................. 379/60; 379/59; 455/33; 455/34
[58] Field of Search .................. 379/58-60; 455/33, 34

[56] References Cited

U.S. PATENT DOCUMENTS 3,764,915 10/1973 Cox et al. .................. 379/58
4,485,486 11/1984 Webb et al. .
4,608,711 8/1986 Goldman .
4,670,899 6/1987 Brody et al. .
4,723,266 2/1988 Perry .

FOREIGN PATENT DOCUMENTS 0297062 12/1988 European Pat. Off. .............. 455/33
8701897 3/1987 PCT Int'l Appl. .

OTHER PUBLICATIONS

Jan-Erik Stjernvall, "Calculation of Capacity and Co-Channel Interferences in a Cellular System", *Nordic Seminar on Digital Land Mobile Radio-Communications*, Feb. 5-7, 1985, Espoo, Finland, pp. 209-217.

Primary Examiner—Jin F. Ng
Assistant Examiner—Dwayne D. Bost
Attorney, Agent, or Firm—Burns, Doane, Swecker, & Mathis

[57] ABSTRACT

A method of reducing blockages and call interruption in handling over calls in a cellular mobile radio system. When the signal strength from a base station to a mobile and vice versa falls below a given value the handover shall take place to another base station. In order that the call will not be interrupted, a smaller number of channels are reserved, so-called rescue channels, from the ordinary channels in the system. The rescue channels can be fixed or dynamic for a given base station.

2 Claims, 2 Drawing Sheets

METHOD OF REDUCING BLOCKAGES IN HANDING OVER CALLS IN A MOBILE, CELLULAR TELEPHONE SYSTEM

This application is a continuation of application Ser. No. 07/341,584, filed Apr. 21, 1989 now abandoned.

TECHNICAL FIELD

The present invention relates to a method of reducing the blockage in a mobile cellular telephone system, which can occur when a call is being handed over from one to another radio channel.

The method can be used in both frequency division multiple access (FDMA) systems and time division multiple access (TDMA) systems.

BACKGROUND ART

A mobile telephone exchange is linked up to the telephone line network. This exchange serves a plurality of radio transmitters serving as base stations B1, B2, B3 having a limited range. The area a base station serves is called a cell, thus the name "cellular system" (FIG. 1). The different cells are denoted C1, C2, C3, ...

The cells are divided into clusters for achieving a given interference distance between cells with the same frequency. The size of the clusters is different depending on the signal-to-noise ratio which is sought, but a usual number of cells in a cellular cluster is 21 (in theoretical calculations also 3, 7, 9 and 12). Each cluster uses all frequencies, distributed over its stations. Apart from the speech channels there is also one or more call channels per cell, which is used to localize the mobile stations (mobiles) and send messages between base and mobile.

When a speech is to be connected to or from a mobile M, the exchange pages, i.e. it searches for the position of the mobile with the aid of the call channel. Connection to the nearest base and selection of channel subsequently takes place. The speech is blocked if there is no unoccupied channel. If the mobile is moving during the established call, it sometimes occurs that it passes a cell boundary G. The exchange automatically performs a handover, i.e. transfer of the established call from the base B1 to the new base B4.

When fixed frequency allocation is used, each base has access to a plurality of channels for establishing calls. If all channels are occupied when a new call arrives, the latter must be blocked. To avoid interference, cells with the same frequency must have a given interference distance to each other.

In adaptive channel selection, fixed frequency allocation is not used for the bases but the frequency allocation can vary in response to measured signal-noise ratios, see below.

In the adaptive channel selection, no consideration is paid to how great the interference distance is, and it is important that the calls do not interfer with each other. Theoretically, if not practically, the mobiles can be placed side by side and send on the same frequency.

The basis for the adaption are the signal-noise ratios (C/I) measured in the bases and mobiles. The signal paths between a mobile and its base MS-BS and an interfering mobile-base-pair MSs-BSs are shown in FIG. 2. $S_1$-$S_4$ is the received signal strength in the respective communication. They are equal in both directions, apart from Rayleigh fading.

Connection establishment always takes place to the base which is best according to some criterion, e.g. the best base being the one with the strongest signal. If the base does not have any unoccupied channels, MS can be ordered to make a new selection (next best).

After measuring all signal-noise-ratios, selection of a channel having the greatest C/I value is carried out. For each channel, the lowest of the four C/I values is used, but a simpler alternative can also be envisaged where only the C/I values for BS and MS are considered. No consideration is then taken to whether there will be interference in existing connections. This alternative is used in the embodiment below.

Handover takes place on two occasions:

1. When the quality falls below the minimum limit which has been set, the call must be transferred to a better channel. This is carried out as an ordinary channel selection, but if no sufficiently good channel is available, the call changes base station and makes a new channel selection.

2. When the used base is no longer best or when no acceptable channel is available, change of base takes place. A request for handover can be sent from MS via the old BS to the new one via the telephone network, or directly between MS and the new BS via the call channel.

DISCLOSURE OF INVENTION

Within the cellular area in FIG. 1 the mobiles may be stationary or moving. The movability of the mobiles may be great and there can be a large number of requests for handovers. Apart from such requests, there are ringing call requests from new stations or mobiles in movement in movement within the area. However, priority must be given to already established calls which request handover before dealing with mobiles attempting call requests. An exception is emergency ringing calls and the like which have specially allocated channels. With a heavy increase of the number of handover requests there is also considerably greater risk of interrupted calls in spite of the share of successful handovers being very great. The tables set out below, made after simulations, illustrate this.

Handover threshold: 10 dB. Connection threshold: 13 dB. Offered traffic relates to two cases: 10 Erlang and 14 Erlang. The number of available channels is 90.

TABLE 1:

| Call request blockages for moving and stationary mobiles for different offered traffic. | | |
|---|---|---|
| CALL REQUEST BLOCKAGES | 10 E | 14 E |
| Stationary | 1,8% | 7,1% |
| Moving | 1,2% | 4,6% |

The share of interrupted calls increases substantially:

TABLE 2:

| Interruption risk for moving and stationary mobiles for different offered traffic. | | |
|---|---|---|
| INTERRUPTION RISK | 10 E | 14 E |
| Stationary | 0,025% | 0,101% |
| Moving | 1,808% | 9,360% |

That the risk becomes so great depends on the large number of handovers each call needs to make, in certain cases right up to as much as 50 handovers. This is clearly seen in the figures for calls which managed completely without any handover:

TABLE 3:

| Calls without handover for moving and stationary mobiles for various offered traffic. | | |
|---|---|---|
| CALLS WITHOUT HANDOVER | 10 E | 14 E |
| Stationary | 99,8% | 99,6% |
| Moving | 41,4% | 36,8% |

The possibility of succeeding with a handover is large, even so:

TABLE 4:

| Successful handovers for moving and stationary mobiles in different offered traffic. | | |
|---|---|---|
| SUCCESSFUL HANDOVER | 10 E | 14 E |
| Stationary | 86,7% | 81,2% |
| Moving | 99,3% | 97,0% |

All together it can be said that the heavy increase of the number of handover requests gives a considerably greater risk of interrupted calls, in spite of the share of successful handovers being very great.

According to the proposed method, the risk can be reduced considerably by reserving a smaller number of channels for these calls from the channels allocated to the system.

The object of the present invention is thus to reduce blockage in so-called handovers in a mobile telephone system by increasing the channel availability at the cost of available channels upon call request.

The method in accordance with the invention is characterized as will be apparent from the characterizing part of claim 1.

BRIEF DESCRIPTION OF DRAWINGS

The method in accordance with the invention will now be described in more detail and with reference to the accompanying drawings, where FIG. 1 schematically illustrates a part of a cell pattern for a mobile cellular telephone system described under "BACKGROUND ART"

BEST MODE FOR CARRYING OUT THE INVENTION

Figure 1:
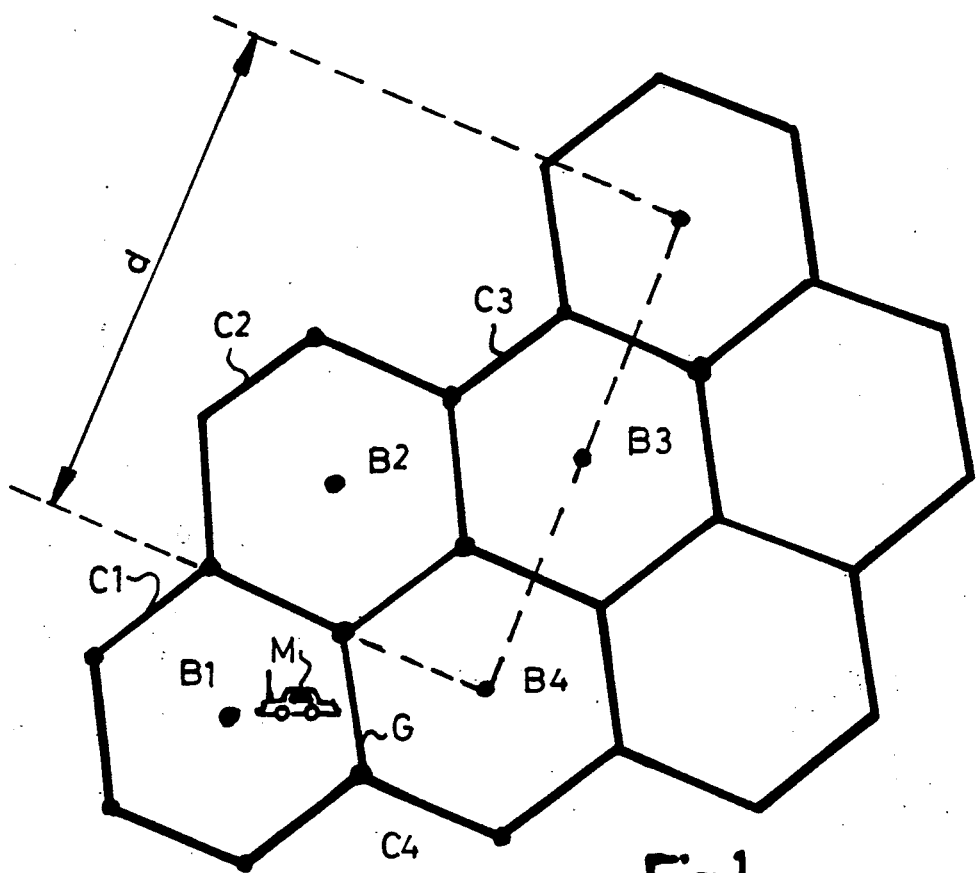
Figure 2:
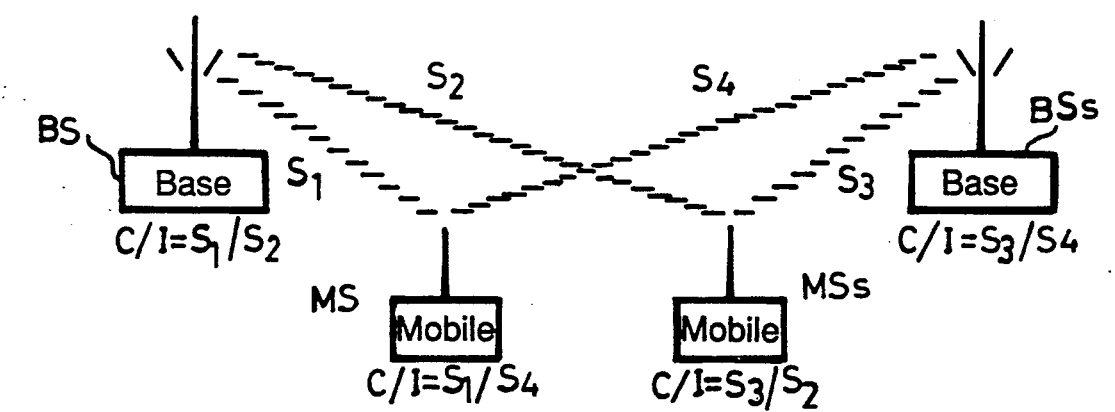
FIG. 2 illustrates the signal paths between two mobile-base pairs described in "BACKGROUND ART", FIG. 3 schematically illustrates channel allocation according to the proposed method for fixed channel allocation within the cell pattern according to FIG. 1, FIG. 4 schematically illustrates another application of the proposed method in so-called adaptive allocation in the cell pattern according to FIG. 1.
Figure 3:
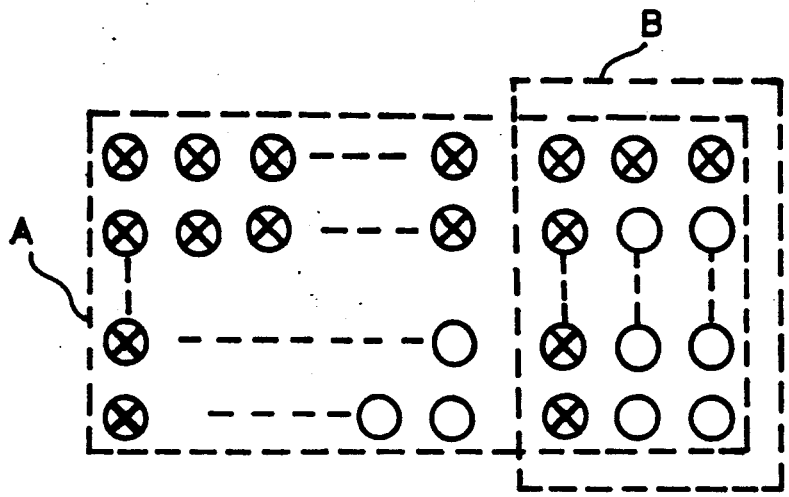

FIG. 3 generally illustrates a so-called fixed channel allocation for the bases B1, B2, ... in the cell pattern according to FIG. 1. The channels are marked by rings where a cross in the ring denotes an occupied channel and an empty ring denotes an unoccupied channel. Each row of rings within the area A is assumed to be available to a given base, i.e. the first row is available to the base B1, the second row to the base B2 etc. All channels are fixedly allocated, i.e. row 1 can only be utilized by base B1, row 2 can only be utilized by base B2 etc.

According to the proposed method, a smaller number of channels within the area B is reserved from A as so-called rescue channels for being utilized in handing over calls and for emergency ringing calls. The risk of call interruption can thus be reduced. The channels within the area B which are to be used either for handover or for emergency ringing calls can be fixed or dynamically allocated, i.e. either a fixed number can be reserved solely for handover and the rest for emergency ringing calls, or all channels for a given base within the area B can be available for both handover and emergency ringing calls.

Figure 4:
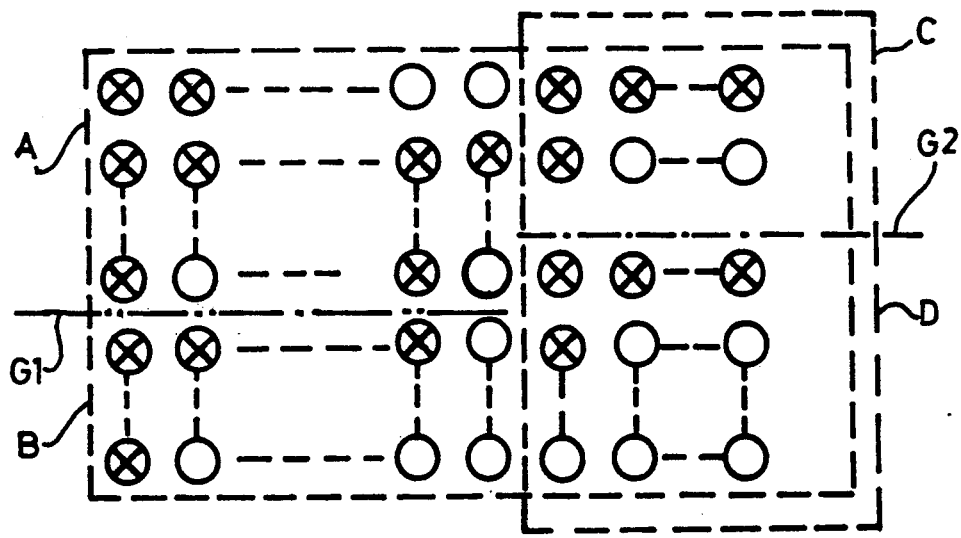

FIG. 4 illustrates so-called dynamic channel allocation for the bases B1, B2, ... in the cell pattern according to FIG. 1. Here the area A denotes the channels which, as with the area A in FIG. 3, are permanently allocated to each base (one row corresponds to a given base). The channels in the area B are the so-called dynamic channels, and can be allocated to any base within the cell pattern. The total number of channels within the areas A and B is the same as the number of channels within the area A in FIG. 3. The boundaries for the fixed and the dynamically allocated channels are denoted by G1 for the ordinary channels (A and B) and with G2 for the reserved channels (C and D).

When there is a handover from a mobile within a cell C1, which is to be transferred to the next cell C4, connection attempts are made in the following order:

1. Strongest base, search on ordinary channels (area A or B in FIGS. 3 or 4).
2. Next strongest base, search on ordinary channels. If handover is not successful after these two attempts, attempts are made with
3. Strongest base, reserve channels (area B, FIG. 3; and D, FIG. 4).
4. Next strongest base, reserved channels.
5. If these steps do not give a successful handover blocking takes place.

The above-mentioned steps with two attempts using ordinary channels and two attempts using the rescue channels were used in the above-mentioned simulation. It is of course possible that the connection attempt must be increased by three attempts using the ordinary channels if two attempts are unsuccessful on these, and thereafter, if these three attempts have been unsuccessful, to carry out one, two or three or possibly more attempts using the rescue channels.

Handover attempts are not only made for weak signal strength, e.g. at a cell boundary, but may also be made when an interfering mobile-base pair is present.

Connection to fixed channels is preferably made as far as they are not occupied, and in the second place adaptive channel selection is made by the dynamic channels illustrated in FIG. 4.

The reserved channels enable the probability of a successful handover to increase. A method further ensuring the handover function is to use a cell pattern (reuse pattern) for the reserved channels which results in a lower degree of co-channel interference. Such cell patterns for the radio channels in a general cellular radio communication system are illustrated in the article "Calculation of Capacity and Co-Channel Interference in a Cellular System" from the conference report "Nordic Seminar on Digital Land Mobile Radio-communication" Feb. 5–7, 1985, Espoo Finland, pp 209–217.

If, for example the ordinary channels are allotted a 3-cell pattern, the reserved channels can be allotted a 9-cell pattern according to FIGS. 4a and 4b, respectively, in said report on page 211. The longer distance between reused channels in a 9-cell pattern compared with the distance in a 3-cell pattern results in that the grade of co-channel interference is less in a 9-cell pattern than in the 3-cell pattern (see diagram on FIG. 6 in the report).

If the signal quality becomes so low that a handover is required, a change to the reserved channels in a 9-cell pattern results in that the signal quality will be higher, on an average, due to a lower degree of interference, than if the channels had been in a 3-cell pattern. The reservation of channels increases the possibility that there will at all be unoccupied channels available at the request for handover. The division of the reserved channels into a 9-cell pattern (in this example) increases the probability of the communication quality increasing after a handover.

Simulations have been carried out on a mobile, cellular telephone system with a cell pattern according to FIG. 1 and in which the method in accordance with the invention was utilized.

Results obtained are shown below in tabular form.

The division of channels is the parameter which can be varied. When "rescue channels" are only to be used when ordinary channels are not available, the former should only be a small part of a number of available channels. This is not least important since it leads to increased congestion amongst ordinary channels and increased ringing call blockages. 90 channels have been used in the simulations. Of these 10% (9 channels) have been used as "reference channels" and the remaining 81 as ordinary channels.

The result of the simulations gave, as expected, an increased amount of ringing call blockage:

TABLE 1:

| Ringing call blockage for systems with and without rescue channels in different offered traffic. | | |
|---|---|---|
| RINGING CALL BLOCKAGE | 10 E | 14 E |
| 90/0 | 1,2% | 4,6% |
| 81/9 | 2,4% | 7,6% |

The loss of a channel/cell thus leads to increased congestion among the ordinary channels. This also leads to a decreased share of calls without handover:

TABLE 2:

| Calls without handovers for systems with and without rescue channels in different offered traffic. | | |
|---|---|---|
| CALLS WITHOUT HANDOVERS | 10 E | 14 E |
| 90/0 | 41,4% | 36,8% |
| 81/9 | 38,4% | 33,0% |

The share of successful handovers, which was already very high, has now increased to nearly 100%.

TABLE 3:

| Successful handovers for systems with and without rescue channels in different offered traffic: | | |
|---|---|---|
| SUCCESSFUL HANDOVERS | 10 E | 14 E |
| 90/0 | 99,30% | 96,99% |
| 81/9 | 99,98% | 99,18% |

TABLE 4:

| Interruption risk for systems with and without rescue channels in different offered traffic. | | |
|---|---|---|
| INTERRUPTION RISK | 10 E | 14 E |
| 90/0 | 1,808% | 9,360% |

TABLE 4:-continued

| Interruption risk for systems with and without rescue channels in different offered traffic. | | |
|---|---|---|
| INTERRUPTION RISK | 10 E | 14 E |
| 81/9 | 0,053% | 3,029% |

Table 4 shows that the interruption risk has fallen when rescue channels in accordance with the method have been used. In summary, it may be said that the rescue channels function very well as long as low traffic (10 Erlang) is offered. These are then used sparingly and can therefore maintain most of the established calls.

We claim:

1. A method of allocating radio channels in a mobile, cellular radio telephone system in order to reduce blockage of hand-offs between radio channels, said system covering a land area divided into a plurality of cells being grouped into clusters and each cluster containing a predetermined number of said plurality of cells and using all of said radio channels, at least one of said radio channels being fixedly allocated to a certain cell and at least one of said radio channels being dynamically allocated to all of the cells in a cluster, comprising the steps of:

preserving a predetermined number of radio channels (C, D) of a total number of channels (A, B) normally allocated an m-cell cluster and allocating said preserved channels to an n-cell cluster, where n>m, for hand-off requests from a mobile radio station from one radio channel to another radio channel, and dynamically allocating at least one (D) of said preserved radio channels (C, D) in said n-cell cluster to base stations in said m-cell cluster.

2. A handoff method in a mobile, cellular radio telephone system covering a land are divided into cells, said cells being grouped into clusters, and each cluster containing a certain number of cells and using all the radio channels of the system, some of said radio channels being fixedly allocated channels serving a certain cell and some being dynamically allocated serving all the cells in a cluster, and in which system a determined number of radio channels of the total number of ordinary channels which are normally allocated to an n-cell cluster are instead allocated to an m-cell cluster as preserved channels, where m>n, comprising the steps of a) carrying out a number of call connection attempts across said ordinary channels in the n-cell cluster by measuring the signal strength from a number of base stations and selecting the base station the signal strength of which has the greatest value, and requiring a connection across the corresponding channel, and, if the required connection is not possible, requiring a connection across the ordinary channel in the n-cell cluster corresponding to the base station having the next strongest signal, and b) if the call connection attempts made by the foregoing steps in the n-cell cluster are not successful, carrying out a number of further call connection attempts across one of said reserved channels in the m-cell cluster by measuring the signal strength from a number of base stations and selecting the base station whose signal strength has the greatest value, requiring a connection across the corresponding preserved channel, in the m-cell cluster, and, if the required connection is not possible, measuring the signal strength and selecting the base station which gives the next strongest signal across said reserved channels, and requiring a connection across the corresponding channel in the m-cell cluster until a hand-off has been completed.

* * * * *